United States Patent
Kim

(10) Patent No.: US 8,717,585 B2
(45) Date of Patent: May 6, 2014

(54) PRINTING CONTROL METHOD AND PRINTING CONTROL TERMINAL DEVICE FOR IMAGE FORMING APPARATUS DURING PRINTING XML PAPER SPECIFICATION FILE

(75) Inventor: So-hye Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1066 days.

(21) Appl. No.: 12/644,180

(22) Filed: Dec. 22, 2009

(65) Prior Publication Data

US 2010/0157364 A1 Jun. 24, 2010

(30) Foreign Application Priority Data

Dec. 22, 2008 (KR) ................. 2008-131415

(51) Int. Cl.
*G06F 3/12* (2006.01)
(52) U.S. Cl.
USPC .......... 358/1.13; 358/1.9; 358/1.15; 358/1.16
(58) Field of Classification Search
USPC ................. 358/1.13, 1.9, 1.15, 1.16
See application file for complete search history.

(56) References Cited

U.S. PATENT DOCUMENTS

| 8,300,238 | B2 | 10/2012 | Kato | |
| 2008/0024802 | A1* | 1/2008 | Kato | 358/1.9 |
| 2008/0120615 | A1 | 5/2008 | Huang et al. | |
| 2008/0151294 | A1* | 6/2008 | Natori et al. | 358/1.15 |
| 2010/0027043 | A1 | 2/2010 | Kato | |

FOREIGN PATENT DOCUMENTS

| JP | 2008-234506 | 10/2008 |
| JP | 2008-242661 | 10/2008 |
| WO | 2008/117807 | 10/2008 |

OTHER PUBLICATIONS

Shimizu, Printing System and Host Device for Use in This System, Oct. 2, 2008, JP 2008234506 A.*
Extended European Search Report dated Oct. 12, 2012 in EP Patent Application No. 09178395.1.
Korean Office Action dated Oct. 31, 2013 issued in KR Application No. 10-2008-0131415.

* cited by examiner

Primary Examiner — Benny Q Tieu
Assistant Examiner — Martin Mushambo
(74) Attorney, Agent, or Firm — Stanzione & Kim, LLP

(57) ABSTRACT

A printing control method includes searching for an XML paper specification (XPS) attribute file from an XPS file if a command to print the XPS file is received, determining whether the searched XPS attribute file is located within a preset portion of the XPS file, adjusting a structure of the XPS file if the XPS attribute file is not located within the preset portion of the XPS file, and transmitting the XPS file of the adjusted structure to an image forming apparatus. Accordingly, the speed of the image forming apparatus recognizing the XPS file can be enhanced.

18 Claims, 9 Drawing Sheets

FIG. 2

| Description | Content type |
|---|---|
| FixedDocument | application/vnd.ms-package.xps-fixeddocument+xml |
| FixedDocumentSequence | application/vnd.ms-package.xps-fixeddocumentsequence+xml |
| FixedPage | application/vnd.ms-package.xps-fixedpage+xml |
| DiscardControl | application/vnd.ms-package.xps-discard-control+xml |
| DocumentStructure | application/vnd.ms-package.xps-documentstructure+xml |
| Font | application/vnd.ms-opentype |
| ICC profile | application/vnd.ms-color.iccprofile |
| JPEG image | image/jpeg |
| Obfuscated font | application/vnd.ms-package.obfuscated-opentype |
| PNG image | image/png |
| PrintTicket | application/vnd.ms-printing.printticket+xml |
| Remote resource dictionary | application/vnd.ms-package.xps-resourcedictionary+xml |
| StoryFragments | application/vnd.ms-package.xps-storyfragments+xml |
| TIFF image | image/tiff |
| Thumbnail part | image/jpeg or image/png |
| Windows Media Photo image | image/vnd.ms-photo |

FIG. 3

```
<Override PartName="/_rels/.rels"
ContentType="application/vnd.openxmlformats-package.relationships+xml"/>

<Override PartName="/FixedDocumentSequence.fdseq"
ContentType="application/vnd.ms-package.xps-fixeddocumentsequence+xml"/>

<Override PartName="/Documents/1/Resources/Fonts/0DDC8552-418B-4DCA-B6FC-537279F2A32D.odttf"
ContentType="application/vnd.ms-package.obfuscated-opentype"/>

<Override PartName="/_rels/FixedDocumentSequence.fdseq.rels" ContentType="application/vnd.openxmlformats-package.relationships+xml"/>

<Override PartName="/Metadata/Job_PT.xml"
ContentType="application/vnd.ms-printing.printticket+xml"/>

<Override PartName="/Documents/1/_rels/FixedDocument.fdoc.rels" ContentType="application/vnd.openxmlformats-package.relationships+xml"/>

<Override PartName="/Metadata/MXDC_Empty_PT.xml"
ContentType="application/vnd.ms-printing.printticket+xml"/>

<Override PartName="/Documents/1/Pages/1.fpage"
ContentType="application/vnd.ms-package.xps-fixedpage+xml"/>

<Override PartName="/Documents/1/Pages/_rels/1.fpage.rels" ContentType="application/vnd.openxmlformats-package.relationships+xml"/>

<Override PartName="/Documents/1/Metadata/Page1_PT.xml"
ContentType="application/vnd.ms-printing.printticket+xml"/>

<Override PartName="/Documents/1/FixedDocument.fdoc"
ContentType="application/vnd.ms-package.xps-fixeddocument+xml"/>
```

FIG. 5

```
┌─ NEW Local file Name ──────────────────────────────────────┐
│ "XPS_PACKAGE_YES" + "4D36E979-E325-11CE-BFC1-08002BE10318" │
│ "XPS_PACKAGE_NO"  + "4D36E979-E325-11CE-BFC1-08002BE10318" │
└────────────────────────────────────────────────────────────┘
```

FIG. 6

```
┌──────────────────────────┐
│ @PJL XPS EMLL SET = YES  │
│ @PJL XPS EMLL SET = NO   │
└──────────────────────────┘
```

-- PRIOR ART --

PRINTING CONTROL METHOD AND PRINTING CONTROL TERMINAL DEVICE FOR IMAGE FORMING APPARATUS DURING PRINTING XML PAPER SPECIFICATION FILE

CROSS-REFERENCE TO RELATED APPLICATIONS

This application claims priority under 35 U.S.C. §119 (a) from Korean Patent Application No. 10-2008-0131415, filed on Dec. 22, 2008, in the Korean Intellectual Property Office, the disclosure of which is incorporated herein by reference in its entirety.

BACKGROUND

1. Field of the General Inventive Concept

The present general inventive concept relates to a printing control method and a printing control terminal device. More particularly, the present general inventive concept relates to a printing control method by which an image forming apparatus can enhance the speed to recognize an XML paper specification (XPS) file, and a printing control terminal device implementing the same.

2. Description of the Related Art

In general, image forming apparatuses are devices that print printing data generated by a terminal device, such as computer, on a recording medium. Example of image forming apparatuses include copiers, printers, facsimile machines, and multifunction peripherals (MFP) implementing the functions of the aforementioned machines using a single device.

Recent image forming apparatuses support a function for printing an XPS file using an XPS emulator as well as data written in a Page Description Language (PDL) such as Post Script (PS) and Printer Command Language (PCL), which are provided conventionally.

An XPS file is a fixed-layout electronic file designed to preserve document fidelity and be capable of sharing the file, which is a zip archive in which all the resources needed for a corresponding document or job are systemized in a directory structure and the relationship between the directories is made up using an Extensible Markup Language (XML). Such an XPS file has a logical structure of a tree type having a plurality of layers as illustrated in FIG. 9.

Referring to FIG. 9, the XPS file consists of levels such as a job level, a document level, and a page level. Each document level and each page level may include a plurality of documents and a plurality of pages, respectively. Different printing options can be set for each document and each page.

A process of an image forming apparatus recognizing an XPS file is different from a conventional process of an image forming apparatus recognizing a PS file and a PCL file. More specifically, an image forming apparatus recognizes a PS file and a PCL files by analyzing a Printer Job Language (PJL) command received from a terminal device. However, an image forming apparatus recognizes an XPS file by detecting an XPS attribute file contained in the XPS file.

However, since the position of an XPS attribute file is not fixed at a specific position of an XPS file, it is not easy for an image forming apparatus to determine whether received data is an XPS file. In particular, if an image forming apparatus determines a type of received printing data using only a predetermined portion of the received printing data, the image forming apparatus may not recognize the received printing data, thereby causing an error.

SUMMARY

The present general inventive concept provides a printing control method by which an image forming apparatus can enhance the speed to recognize an XML paper specification (XPS) file, and a printing control terminal device.

Additional aspects and utilities of the present general inventive concept will be set forth in part in the description which follows and, in part, will be obvious from the description, or may be learned by practice of the general inventive concept.

Embodiments of the present general inventive concept may be achieved by providing a printing control method of a printing control terminal device connected to an image forming apparatus which is capable of printing an XPS file including searching for an XML paper specification (XPS) attribute file in an XPS file if a command to print the XPS file is received, determining whether the searched XPS attribute file is located within a preset portion of the XPS file, adjusting a structure of the XPS file if the XPS attribute file is not located within the preset portion of the XPS file, and transmitting the XPS file of the adjusted structure to an image forming apparatus.

The XPS attribute file may be a file "Content_Types.xml."

The searching operation may include searching for the XPS attribute file from the XPS file by identifying whether the XPS attribute file contains an attribute value "vnd.ms-package.xps."

The determining operation may include determining whether the XPS attribute file is located within the preset portion of the XPS file based on a physical position of the XPS attribute file.

The adjusting operation may include changing the structure of the XPS file so that the XPS attribute file can be located within the preset portion of the XPS file.

The adjusting operation may include inserting a local file to indicate an XPS file into the preset portion of the XPS file.

The printing control method may further include storing the XPS file of the adjusted structure.

The searching may further include searching for the position of an XPS attribute file from an XPS file which is requested to be printed.

Embodiments of the present general inventive concept may also be achieved by providing a printing control method of a printing control terminal device connected to an image forming apparatus which is capable of printing an XPS file including searching for an XML paper specification (XPS) attribute file from an XPS file if a command to print the XPS file is received, generating a local file to indicate an XPS file if the searched XPS attribute file is not located within a preset portion of the XPS file, and sequentially transmitting the generated local file and the XPS file to an image forming apparatus.

The searching for an XPS attribute file may further include searching for a physical position of a "Content_Types.xml" file in the XPS file which has been compressed in a ZIP file format.

Embodiments of the present general inventive concept may also be achieved by providing a printing control terminal device connected to an image forming apparatus which is capable of printing an XPS file including a user interface unit to receive a command to print an XML paper specification (XPS) file, a driver unit to adjust a structure of the XPS file so that an XPS attribute file of the XPS file can be located within a preset portion of the XPS file, and a control unit to transmit the XPS file, in which a position of the XPS attribute file is adjusted, to an image forming apparatus.

The XPS attribute file may be a file "Content_Types.xml."

The driver unit may include a search unit to search for the XPS attribute file from the XPS file, a determination unit to determine whether the searched XPS attribute file is located within the preset portion of the XPS file, and an adjustment unit to adjust the structure of the XPS file if the XPS attribute file is not located within the preset portion of the XPS file.

The search unit may search for the XPS attribute file from the XPS file by identifying whether the XPS attribute file contains an attribute value "vnd.ms-package.xps."

The determination unit may determine whether the XPS attribute file is located within the preset portion of the XPS file based on a physical position of the XPS attribute file.

The adjustment unit may change the structure of the XPS file so that the XPS attribute file can be located within the preset portion of the XPS file.

The adjustment unit may generate a local file to indicate an XPS file, and insert the local file into the preset portion of the XPS file.

The printing control terminal device may further include a storage unit to store the XPS file of the adjusted structure.

Embodiments of the present general inventive concept may also be achieved by providing a printing control terminal device connected to an image forming apparatus which is capable of printing an XPS file including a user interface unit to receive a command to print an XML paper specification (XPS) file, a driver unit to generate a local file to indicate that the file is an XPS file if an XPS attribute file of the XPS file is not located within a preset portion of the XPS file, and a control unit to sequentially transmit the generated local file and the XPS file to an image forming apparatus.

Embodiments of the present general inventive concept may also be achieved by providing a system to print an XPS file, including a printing control terminal device to receive a request to print an XPS file and including a driving unit to configure the XPS file in a predetermined form recognizable by an image forming apparatus, and an image forming apparatus to receive the XPS file transmitted from the printing control terminal device in a recognizable form.

Embodiments of the present general inventive concept may also be achieved by providing system to print an XPS file, including an image forming apparatus including a plurality of emulators to process a plurality of different file types including an XPS emulator, and printing control terminal device to create an XPS file with an adjusted structure and to transmit the adjusted XPS file to the image forming apparatus to be processed by the XPS emulator.

The printing control terminal device may include an adjustment unit to create the adjusted XPS file if an XPS file is not recognizable by the image forming apparatus as an XPS file.

The printing control terminal device may include an adjustment unit to change the position of an XPS attribute file within an XPS file to create the adjusted XPS file.

Embodiments of the present general inventive concept may also be achieved by providing a printing control terminal device, including a user interface to receive a command to print an XPS file, a search unit to locate a physical position of an XPS attribute file within the XPS file, a determination unit to determine whether the XPS attribute file is located in a preset position of the XPS file, and an adjustment unit to adjust the structure of the XPS file so that the adjusted XPS file is recognizable by an image forming apparatus.

The search unit may transmit the physical location to the determination unit.

The adjustment unit may adjust the structure of the XPS file by changing a position of the XPS attribute file to a location recognizable by the image forming apparatus. The location recognizable by the image forming apparatus may be the preset position.

The adjustment unit may generate a local file to indicate to the image forming apparatus that the XPS file is an XPS file.

The adjustment unit may also generate a local file and may insert the generated local file into the preset position.

The adjustment unit may also generate a local file separate to the XPS file to indicate to the image forming apparatus that the XPS file is an XPS file.

Embodiments of the present general inventive concept may also be achieved by providing a printing control method of a printing control terminal device connected to an image forming apparatus which is capable of printing an XPS file, including receiving a command to print an XPS file, locating a physical position of an XPS attribute file within the XPS file, determining whether the XPS attribute file is located in a preset position of the XPS file, adjusting a structure of the XPS file so that the adjusted XPS file is recognizable by an image forming apparatus as an XPS file, and transmitting the adjusted XPS file to an image forming apparatus.

BRIEF DESCRIPTION OF THE DRAWINGS

These and/or other features and utilities of the present general inventive will become apparent and more readily appreciated from the following description of the embodiments, taken in conjunction with the accompanying drawings of which:

FIGS. 2 and 3 illustrate examples of a tag in an XPS attribute file according to an exemplary embodiment of the present general inventive concept;

FIG. 5 illustrates an example of a name of a new local file according to an exemplary embodiment of the present general inventive concept;

FIG. 6 illustrates an example of a PJL command of a new local file according to an exemplary embodiment of the present general inventive concept;

DETAILED DESCRIPTION OF THE EMBODIMENTS

Figure 1:
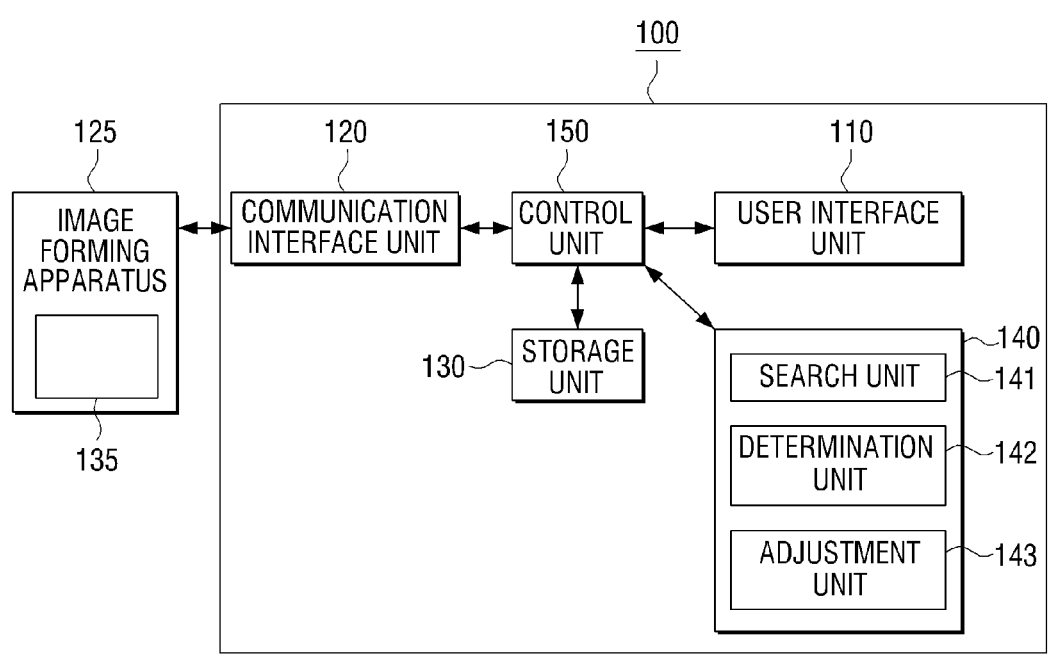
FIG. 1 is a schematic block diagram illustrating a configuration of a printing control terminal device according to an exemplary embodiment of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a schematic block diagram illustrating a configuration of a printing control terminal device 100 according to an exemplary embodiment of the present general inventive concept. Referring to FIG. 1, the printing control terminal device 100 may include a user interface unit 110, a communication interface unit 120, a storage unit 130, a driver unit 140, and a control unit 150.

The user interface unit 110 may include a plurality of function keys which enables a user to set or select diverse functions supported by the printing control terminal device 100, and display diverse information provided by the printing control terminal device 100. The user interface unit 110 may be implemented as a device capable of performing both input and output such as a touch pad, or as a combination of a mouse and a monitor. The user can select an XPS file to be printed and input a printing command for the XPS file using a user interface window provided by the user interface unit 110.

An XPS file may include printing data for which printing options may be set in a logical structure of a tree type configuration having a plurality of layers. More specifically, an XPS file has a plurality of layers, and different printing options can be set for each layer or each node of each tree of the XPS file.

Figure 9:
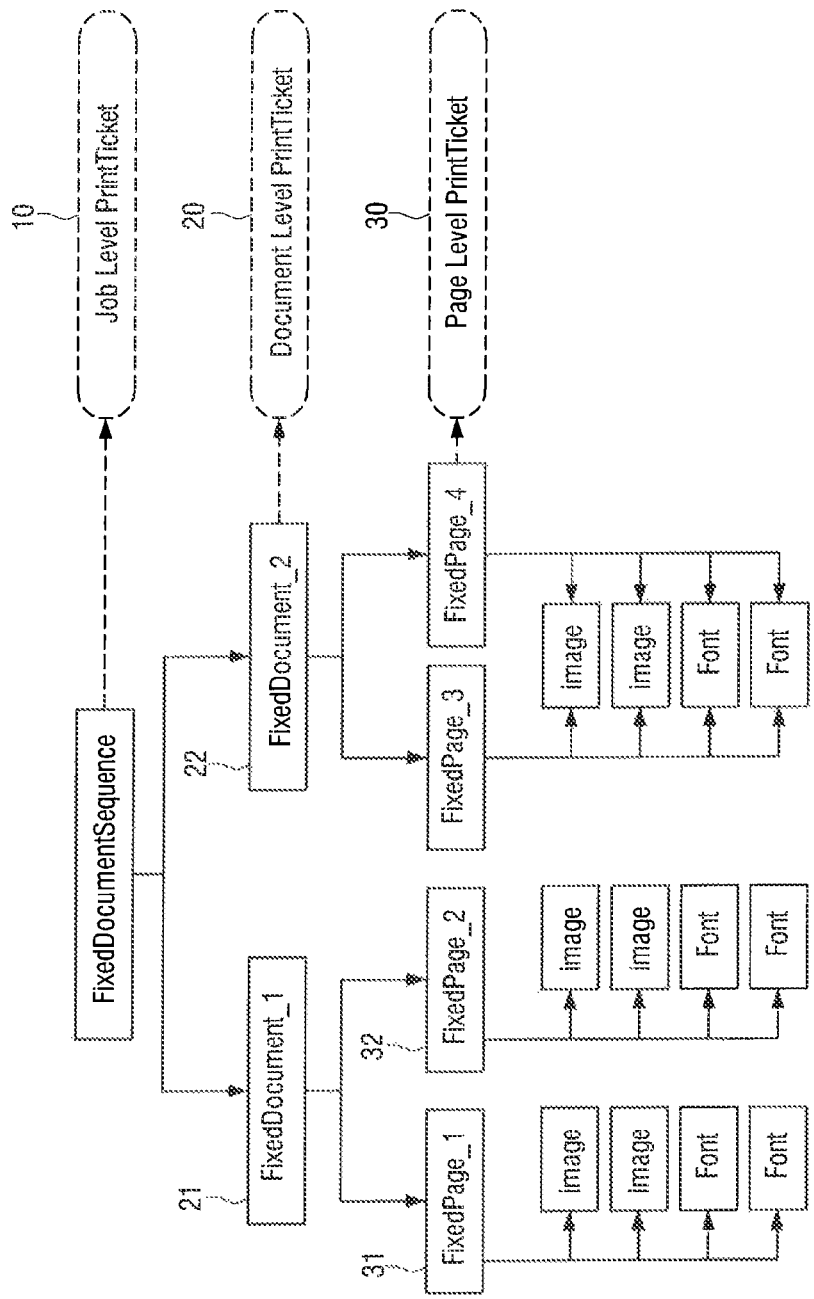
FIG. 9 is a conceptual drawing illustrating a logical structure of an XPS file.

For example, referring to FIG. 9, an XPS file may have layers of three levels such as a job level 10, a document level 20, and a page level 30. Each document level and each page level may include a plurality of documents and a plurality of pages, respectively. Different printing options can be set for each document and each page. More specifically, "double-sided printing" may be set to be a printing option for the job level 10, "2-up" may be set to be a printing option for a first document 21 at the document level 20, "A4 paper" may be set to be a printing option for a first page 31 of the first document 21, and "A5 paper" may be set to be a printing option for a second page 32 of the first document 21. In this case, a printing option at each node of the logical structure is effectively applied to lower layers.

Referring to FIG. 1, the communication interface unit 120 of the printing control terminal device 100 may be connected to an image forming apparatus 125. The image forming apparatus 125 may include a plurality of emulators 135 to process received print data. The communication interface unit may provide the image forming apparatus 125 with printing data of a format which can be processed by the image forming apparatus. Printing data of a format which can be processed by the image forming apparatus may include Page Description Language (PDL) data written in languages such as Printer Command Language (PCL) and Post Script (PS), and XPS files. The image forming apparatus may be an apparatus such as a printer, copier, facsimile, scanner, multi-function peripheral (MFP), or other image forming apparatuses known in the art.

More specifically, the communication interface unit 120 connects the printing control terminal device 100 to an external device, such as the image forming apparatus 125, and may include a parallel port, a Universal Serial Bus (USB) port, and a wireless module.

The storage unit 130 may store a plurality of XPS files. More specifically, the storage unit 130 may store XPS files which the user may generate using an application program, or XPS files which may have been generated for a previous printing job. In addition, the storage unit 130 may store XPS files which have a structure that may be adjusted according to a series of operations which will be described below. The storage unit 130 may be implemented as a storage medium provided in the printing control terminal device 100, an external storage medium, a removable disk including a USB memory, or a web server over a network.

The printing control terminal device 100 includes a driver unit 140 that may adjust a structure of an XPS file so that an XPS attribute file of the XPS file may be positioned within a preset portion of the XPS file. If an XPS attribute file of the XPS file is not located within the preset portion of the XPS file, the driver unit 140 may generate a local file to indicate that the file is an XPS file. More specifically, the driver unit 140 may include a search unit 141, a determination unit 142, and an adjustment unit 143.

The search unit 141 may search for an XPS attribute file in an XPS file. More specifically, the search unit 141 searches for the position of an XPS attribute file from an XPS file which is requested to be printed through the user interface unit 110.

An XPS attribute file is a file contained in an XPS file so as to indicate that current printing data may be an XPS file, and may be a data file such as "Content_Types.xml" in the XPS file. "Content_Types.xml" is a file to explain what the XPS file includes. That is, "Content_Types.xml" may describe a connection relationship between a file used in the XPS file and a file extension, and may redefine a specific Uniform Resource Indicator (URI). In the "Content_Types.xml" file, examples to describe connection relationships between a file used in the XPS file and an extension are illustrated in FIG. 2. Accordingly, the search unit 141 can search for an XPS attribute file by searching for a physical position of the "Content_Types.xml" file in the XPS file which has been compressed in the ZIP file format.

The search unit 141 may identify whether an XPS file which is requested to be printed is an XPS file having an actual printing data function in advance. More specifically, an XPS file may be a fixed-layout electronic file as described above and/or a printer spool file, so there may be an XPS file supporting only the electronic file function without the printing data function. Accordingly, the search unit 141 can determine whether the XPS file has the printing data function by identifying diverse attribute values in the "Content_Types.xml" file. More specifically, if an attribute "Content-Type" in an XPS attribute file includes "application/vnd.ms-package.xps," the XPS file is an XPS file having the printing data function.

FIG. 3 illustrates an example of a "Content_Types.xml" file. Referring to FIG. 3, there are several attribute values "application/vnd.ms-package.xps" in the attribute "Content-Type" of the "Content_Types.xml" file. Accordingly, the search unit 141 determines that the XPS file is an XPS file having the printing data function. Even when there is only one attribute value "application/vnd.ms-package.xps" in the "Content_Types.xml" file, it is determined that the XPS file is an XPS file having the printing data function.

The determination unit 142 can determine whether the searched XPS attribute file is positioned within a preset portion of the XPS file. More specifically, the determination unit 142 can determine whether the XPS attribute file is positioned within a preset portion of the XPS file using information regarding the physical position of the XPS attribute file transmitted by the search unit 141. For example, if an image forming apparatus classifies a type of printing data using initial printing data of 500 bytes which are received from the printing control terminal device 100, the determination unit 142 can determine whether an XPS attribute file is located within 500 bytes of an XPS file. If the XPS attribute file is determined to be located within 500 bytes of the XPS file, the image forming apparatus can recognize that the received printing data is an XPS file. Alternatively, if the XPS attribute file is not located within 500 bytes of the XPS file, the image forming apparatus cannot recognize whether the received printing data is an XPS file. Accordingly, the determination unit 142 may transmit information regarding the position of the XPS attribute file and information regarding the preset portion of the XPS file to the adjustment unit 143 so as to adjust a structure of the XPS file.

The preset portion of the XPS file is a portion of printing data which is used to determine a type of the printing data by the image forming apparatus. The preset portion can vary according to an image forming apparatus. Accordingly, a value optimized by experiments can be set as the preset portion of the XPS file.

If the XPS attribute file is not located within the preset portion of the XPS file, the adjustment unit 143 can adjust a structure of the XPS file. More specifically, if the determination unit 142 determines that the XPS attribute file is not located within the preset portion of the XPS file, the adjustment unit 143 adjusts a structure of the XPS file by changing the location of the XPS attribute file so that the XPS attribute file can be located within the preset portion of the XPS file.

In addition, the adjustment unit 143 may adjust a structure of the XPS file by generating a local file to indicate an XPS file and inserting the generated local file into the preset portion of the XPS file. In addition, the adjustment unit 143 may generate a local file to indicate an XPS file and transmit to the control unit 150 information to transmit the generated local file before transmitting the XPS file to the image forming apparatus. A local file is a file notifying the image forming apparatus that the data file is an XPS file, and may have a file name as illustrated in FIG. 5. In this case, the local file may not include data, or may include a PJL command as illustrated in FIG. 6.

The control unit 150 may transmit the XPS file of the adjusted structure to the image forming apparatus 125. More specifically, the control unit 150 may control the communication interface unit 120 to transmit the XPS file of the adjusted structure and the separate local file, which are received from the driver unit 140, to the image forming apparatus. If the separate local file has been generated by the driver unit 140, the control unit 150 may control the communication interface unit 120 to transmit the local file and the XPS file to the image forming apparatus in sequence.

The control unit 150 may store the XPS file of the adjusted structure in the storage unit 130. More specifically, since the XPS file may be printed repeatedly, the control unit 150 may store the XPS file of the adjusted structure in the storage unit 130. In this case, the control unit 150 may store the XPS file of the adjusted structure with a different name, or may overwrite the XPS file already stored with the XPS file of the adjusted structure. These operations can be selected by the user, or can be automatically performed without separate user commands.

As described above, in order for the image forming apparatus to rapidly determine which emulator will process the received printing data, the printing control terminal device 100 may adjust a structure of the XPS file so that the XPS attribute file is moved into the preset portion of the XPS file or may generate the local file to indicate an XPS file and transmits the local file to the image forming apparatus. Accordingly, the image forming apparatus can rapidly determine that the received printing data has to be processed by an XPS emulator.

In FIG. 1, the driver unit 140 may be implemented as an XPS printer driver to perform a series of operations for an XPS file, and the search unit 141, the determination unit 142, and the adjustment unit 143 in the driver unit 140 may be implemented as a single filter in an XPS printer filter pipeline path.

FIGS. 4A to 4E illustrate structures of XPS files. In FIGS. 4A to 4E, it is assumed that data of an XPS file are transmitted sequentially from top to bottom to an image forming apparatus.

Figure 4A:
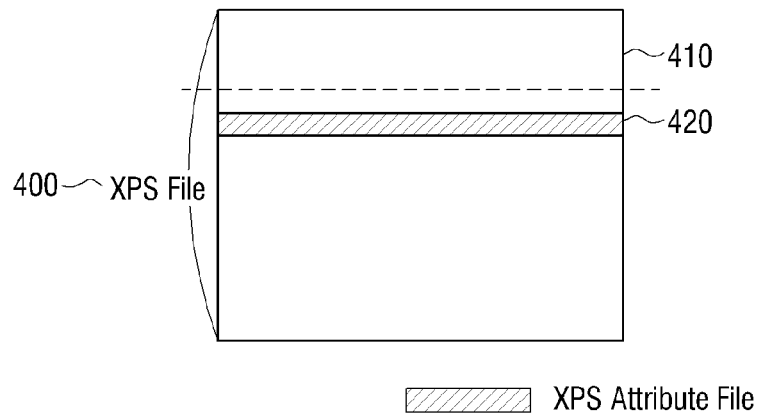
FIGS. 4A to 4E illustrate different structures of XPS files.

Firstly, FIG. 4A illustrates a structure of an XPS file 400 before the position of an XPS attribute file 420 has been changed. In FIG. 4(*a*), the XPS attribute file 420 is not located within a preset portion 410 of the XPS file, which is expressed using a dotted line. The preset portion 410 is the portion above the dotted line. The present portion 410 is not limited to the size illustrated in FIG. 4A, but may be made smaller or larger to accommodate more data or different data related to the XPS file or information to be transmitted to the image forming apparatus 125. If the XPS file 400 is transmitted to an image forming apparatus which determines a type of printing data using only initial data of a preset size as illustrated in FIG. 4A, the image forming apparatus may not be able to determine a type of the received printing data.

Figure 4B:
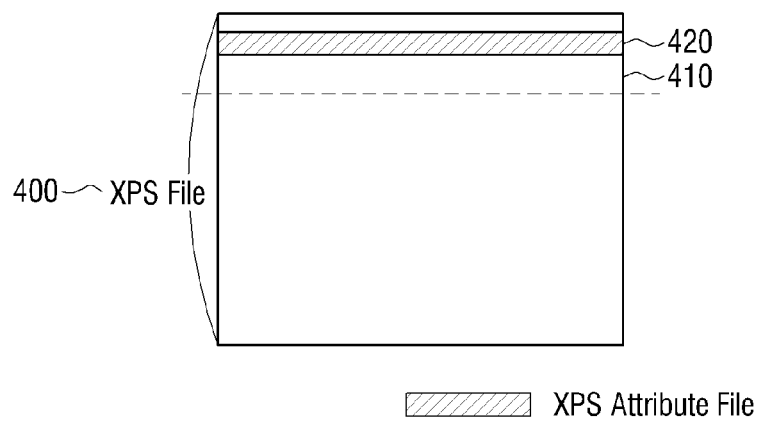

FIGS. 4B to 4E illustrate a structure of XPS files which have been processed according to an exemplary embodiment of the present general inventive concept. Referring to FIG. 4B, the XPS attribute file 420 has been moved into the preset portion 410 of the XPS file 400, which is expressed using the dotted line. Accordingly, the image forming apparatus may detect the XPS attribute file 420 from initial data of the preset size, thereby rapidly determining that a type of the received printing data is an XPS file 400.

Figure 4C:
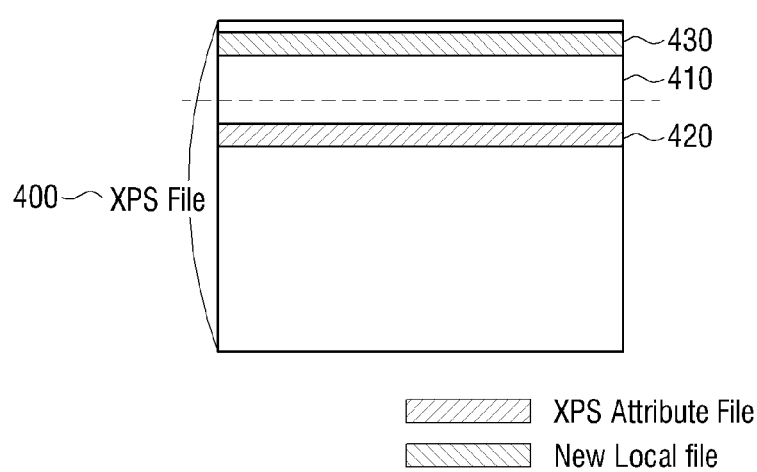

Referring to FIG. 4C, a local file 430 to indicate a type of the printing data has been added into the preset portion 410 of the XPS file. Accordingly, the image forming apparatus may detect the local file 430 from initial data of the preset size, thereby rapidly determining that a type of the received printing data is an XPS file 400.

Figure 4D:
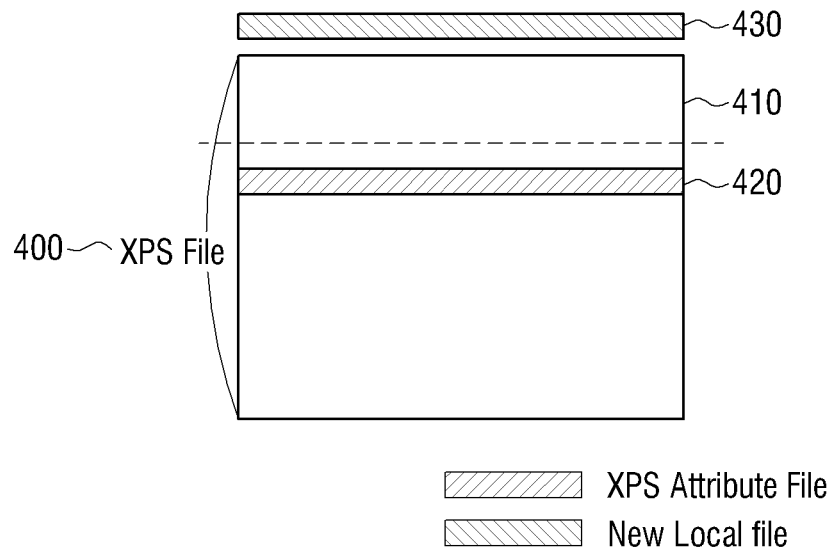

Referring to FIG. 4D, a local file 430 to indicate a type of the printing data has been generated separately from the XPS file 400. Accordingly, the local file 430 may be transmitted to the image forming apparatus prior to the transmission of the XPS file 400, so the image forming apparatus detects the local file, thereby rapidly determining that subsequently received printing data is an XPS file 400.

Figure 4E:
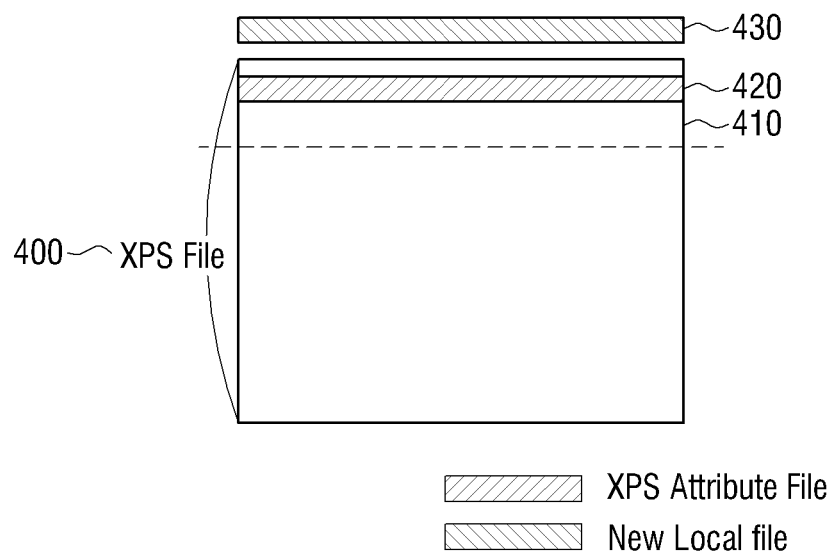

Referring to FIG. 4E, a local file 430 to indicate a type of the printing data has been generated separately from the XPS file 400, and the XPS attribute file 420 has been moved into the preset portion 410 of the XPS file 400, which is expressed using the dotted line. More specifically, FIG. 4E is combination of FIG. 4B and FIG. 4D. Accordingly, the image forming apparatus may detect the local file 430 or the XPS attribute file 420 from initial data of the preset size, thereby rapidly determining that a type of the received printing data is an XPS file.

Figure 7:
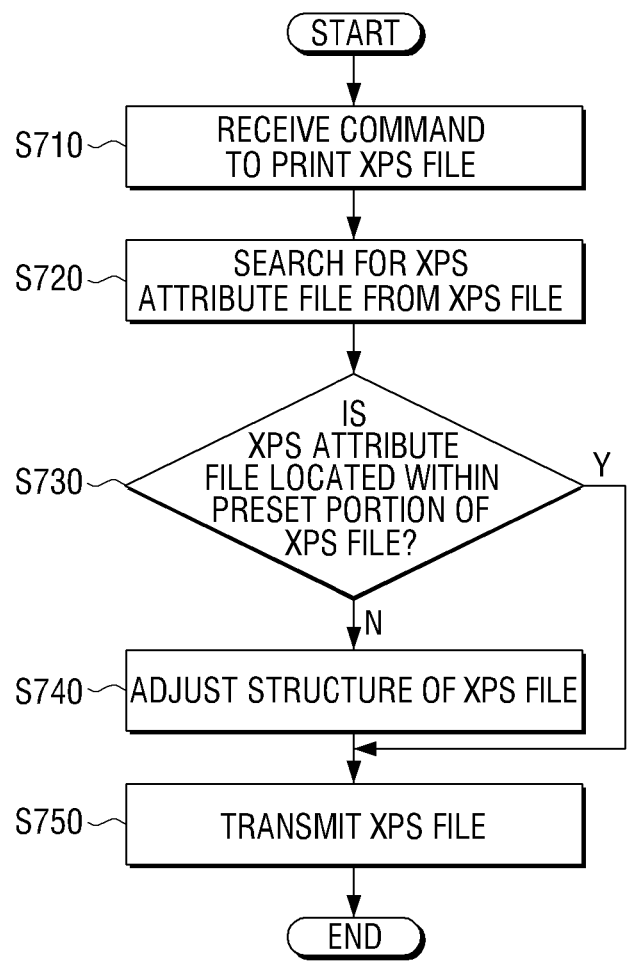
FIG. 7 is a flow chart illustrating a printing control method according to an exemplary embodiment of the present general inventive concept.

FIG. 7 is a flow chart illustrating a printing control method according to an exemplary embodiment of the present general inventive concept.

Referring to FIG. 7, if a command to print an XPS file is received in operation S710, an XPS attribute file is searched for from the XPS file in operation S720. More specifically, the position of the XPS attribute file is searched for from the XPS file which is requested to be printed. An XPS attribute file is a file contained in an XPS file so as to indicate that current printing data may be an XPS file, and may be a file "Content_Types.xml" in the XPS file. Accordingly, the XPS attribute file can be searched for by searching for a physical position of the "Content_Types.xml" file in the XPS file which has been compressed in the ZIP file format.

At this time, it can be identified whether the XPS file which is requested to be printed is an XPS file having an actual printing data function in advance. More specifically, an XPS file may be a fixed-layout electronic file as described above and/or a printer spool file, so there may be an XPS file supporting only the electronic file function without the printing data function. Accordingly, it can be determined whether the XPS file has the printing data function by identifying diverse attribute values in the "Content_Types.xml" file.

It is determined whether the XPS attribute file is located within a preset portion of the XPS file in operation S730. More specifically, it can be determined whether the XPS attribute file is located within the preset portion of the XPS file using information regarding the physical position of the XPS attribute file which is searched for in the searching operation. For example, if an image forming apparatus classifies a type of printing data using initially received printing data of 500 bytes, it can be determined whether the XPS attribute file is located within the preset portion of the XPS file by determining whether the XPS attribute file is located within 500 bytes of the XPS file. The preset portion of the XPS file is a portion of data which is used to determine a type of data by the image forming apparatus. The preset portion can vary according to an image forming apparatus. Accordingly, a value optimized by experiments can be set as the preset portion of the XPS file.

In operation S750, if the XPS attribute file is determined to be located within the preset portion of the XPS file, the XPS file of an original state is transmitted to the image forming apparatus.

Alternatively, in operation S740, if the XPS attribute file is determined not to be located within the preset portion of the XPS file, a structure of the XPS file can be adjusted. More specifically, if the XPS attribute file is not located within the preset portion of the XPS file, a structure of the XPS file may be adjusted by changing the position of the XPS attribute file so that the XPS attribute file can be moved into the preset portion of the XPS file, or by generating a local file to indicate an XPS file and inserting the generated local file into the preset portion of the XPS file. Since the methods and exemplary embodiments to change a structure of the XPS file have been described above with reference to FIGS. 1 and 4, a detailed description is not repeated herein.

Subsequently, in operation S750, the XPS file of the adjusted structure is transmitted to the image forming apparatus. In this case, the XPS file of the adjusted structure can be stored. More specifically, since the XPS file may be printed repeatedly, the XPS file of the adjusted structure may be stored with a name which is different from that of the XPS file already stored, or the XPS file of the adjusted structure may overwrite the XPS file already stored. These operations can be selected by the user, or can be automatically performed without separate user commands.

As described above, since the structure of the XPS file is adjusted in order for the image forming apparatus to easily determine which emulator will process the printing data, the speed of the image forming apparatus recognizing the XPS file can be enhanced.

Figure 8:
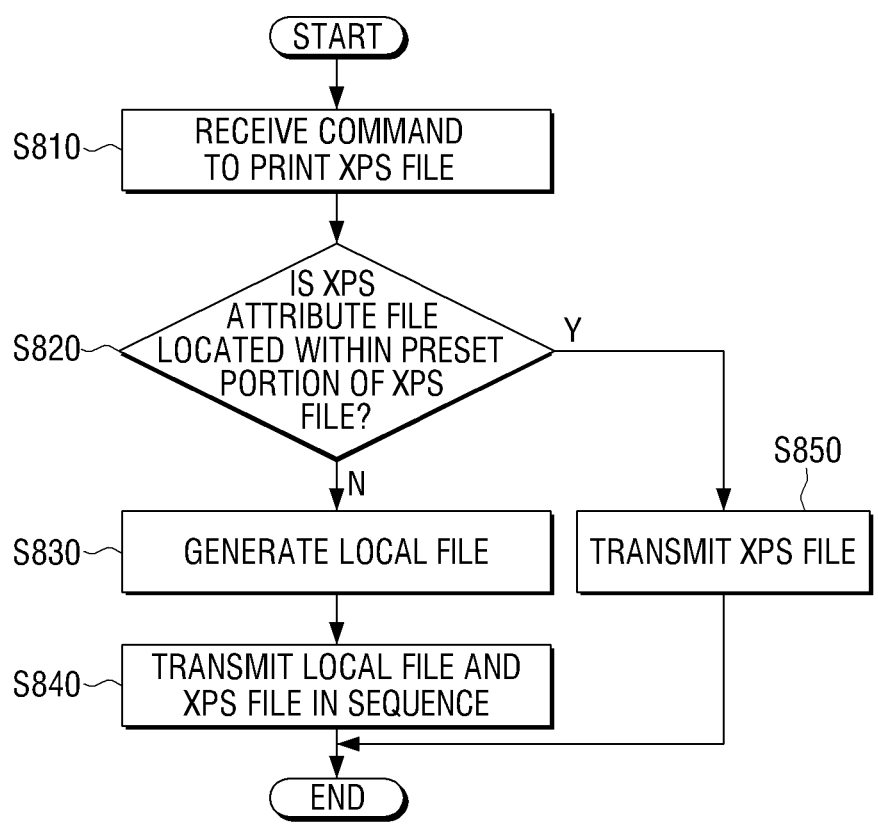
FIG. 8 is a flow chart illustrating a printing control method according to another exemplary embodiment of the present general inventive concept.

FIG. 8 is a flow chart illustrating a printing control method according to another exemplary embodiment of the present general inventive concept.

Referring to FIG. 8, in operation S810 if a command to print an XPS file is received, in operation S820 an XPS attribute file is searched for from the XPS file, and it can then be determined whether the XPS attribute file is located within a preset portion of the XPS file. Since the process of searching for the XPS attribute file and determining whether the XPS attribute file is located within the preset portion of the XPS file is the same as that in FIG. 7, detailed description is not repeated.

In operation S850, if the XPS attribute file is determined to be located within the preset portion of the XPS file, the XPS file of an original state is transmitted to an image forming apparatus.

Alternatively, in operation S830, if the XPS attribute file is determined not to be located within the preset portion of the XPS file, a local file to indicate an XPS file can be generated. More specifically, a local file is a file notifying the image forming apparatus that the data file is an XPS file, and may have a file name as illustrated in FIG. 5. In this case, the local file may not include data, or may include a PJL command as illustrated in FIG. 6.

In operation S840, the generated local file and the XPS file are sequentially transmitted to the image forming apparatus.

As described above, the local file may be transmitted to the image forming apparatus, so the speed of the image forming apparatus recognizing the XPS file can be enhanced. The printing control methods described with reference to FIGS. 7 and 8 can be used by a printing control terminal device having a configuration of FIG. 1, and also can be used by printing control terminal devices having another configuration.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A printing control method of a printing control terminal device connected to an image forming apparatus which is capable of printing an XML paper specification (XPS) file, comprising:
    searching for an XPS attribute file from an XPS file if a command to print the XPS file is received;
    determining whether the searched XPS attribute file is located within a preset portion of the XPS file;
    adjusting a structure of the XPS file if the XPS attribute file is determined not to be located within the preset portion of the XPS file; and
    transmitting the XPS file of the adjusted structure to an image forming apparatus,
    wherein the XPS attribute file is a file contained in an XPS file so as to indicate that current printing data is an XPS file, and
    wherein the searching operation comprises searching for the XPS attribute file from the XPS file by identifying whether the XPS attribute file contains an attribute value "vnd.ms-package.xps."

2. The printing control method according to claim 1, wherein the XPS attribute file is a file "Content_Types.xml."

3. The printing control method according to claim 1, wherein the determining operation comprises determining whether the XPS attribute file is located within the preset portion of the XPS file based on a physical position of the XPS attribute file.

4. The printing control method according to claim 1, wherein the adjusting operation comprises changing the structure of the XPS file so that the XPS attribute file can be located within the preset portion of the XPS file.

5. The printing control method according to claim 1, wherein the adjusting operation comprises inserting a local file to indicate an XPS file into the preset portion of the XPS file.

6. The printing control method according to claim 1, further comprising:
    storing the XPS file of the adjusted structure.

7. The printing control method of claim 1, wherein the searching further comprises searching for the position of an XPS attribute file from an XPS file which is requested to be printed.

8. A printing control method of a printing control terminal device connected to an image forming apparatus which is capable of printing an XML paper specification (XPS) file, comprising:
 searching for an XPS attribute file from an XPS file if a command to print the XPS file is received;
 generating a local file to indicate an XPS file if the searched XPS attribute file is not located within a preset portion of the XPS file; and
 sequentially transmitting the generated local file and the XPS file to an image forming apparatus,
 wherein the XPS attribute file is a file contained in an XPS file so as to indicate that current printing data is an XPS file, and
 wherein the searching operation comprises searching for the XPS attribute file from the XPS file by identifying whether the XPS attribute file contains an attribute value "vnd.ms-package.xps."

9. The printing control method of claim 8, wherein the searching for an XPS attribute file further comprises searching for a physical position of a "Content_Types.xml" file in the XPS file which has been compressed in a ZIP file format.

10. A printing control terminal device connected to an image forming apparatus which is capable of printing an XML paper specification (XPS) file, comprising:
 a user interface unit to receive a command to print an XPS file;
 a driver unit to adjust a structure of the XPS file so that an XPS attribute file of the XPS file can be located within a preset portion of the XPS file; and
 a control unit to transmit the XPS file, in which a position of the XPS attribute file is adjusted, to an image forming apparatus,
 wherein the XPS attribute file is a file contained in an XPS file so as to indicate that current printing data is an XPS file,
 wherein the driver unit comprises a search unit to search for the XPS attribute file from the XPS file, and
 wherein the search unit searches for the XPS attribute file from the XPS file by identifying whether the XPS attribute file contains an attribute value "vnd.ms-package.xps."

11. The printing control terminal device according to claim 10, wherein the XPS attribute file is a file "Content_Types.xml."

12. The printing control terminal device according to claim 10, wherein the driver unit further comprises:
 a determination unit to determine whether the searched XPS attribute file is located within the preset portion of the XPS file; and
 an adjustment unit to adjust the structure of the XPS file if the XPS attribute file is determined not to be located within the preset portion of the XPS file.

13. The printing control terminal device according to claim 12, wherein the determination unit determines whether the XPS attribute file is located within the preset portion of the XPS file based on a physical position of the XPS attribute file.

14. The printing control terminal device according to claim 12, wherein the adjustment unit changes the structure of the XPS file so that the XPS attribute file can be located within the preset portion of the XPS file.

15. The printing control terminal device according to claim 12, wherein the adjustment unit generates a local file to indicate an XPS file, and inserts the local file into the preset portion of the XPS file.

16. The printing control terminal device according to claim 12, further comprising:
 a storage unit to store the XPS file of the adjusted structure.

17. A printing control terminal device connected to an image forming apparatus which is capable of printing an XML paper specification (XPS) file, comprising:
 a user interface unit to receive a command to print an XPS file;
 a driver unit to generate a local file to indicate an XPS file if an XPS attribute file of the XPS file is not located within a preset portion of the XPS file; and
 a control unit to sequentially transmit the generated local file and the XPS file to an image forming apparatus,
 wherein the driver unit comprises a search unit to search for the XPS attribute file from the XPS file, and
 wherein the search unit searches for the XPS attribute file from the XPS file by identifying whether the XPS attribute file contains an attribute value "vnd.ms-package.xps."

18. A printing control method of a printing control terminal device connected to an image forming apparatus which is capable of printing an XML paper specification (XPS) file, comprising:
 receiving a command to print an XPS file;
 searching for an XPS attribute file from the XPS file;
 locating a physical position of the XPS attribute file within the XPS file;
 determining whether the XPS attribute file is located in a preset position of the XPS file;
 adjusting a structure of the XPS file so that the adjusted XPS file is recognizable by an image forming apparatus as an XPS file; and
 transmitting the adjusted XPS file to an image forming apparatus,
 wherein the XPS attribute file is a file contained in an XPS file so as to indicate that current printing data is an XPS file, and
 wherein the searching operation comprises searching for the XPS attribute file from the XPS file by identifying whether the XPS attribute file contains an attribute value "vnd.ms-package.xps."

* * * * *